Sept. 3, 1957     J. H. G. CHOPPINET     2,805,050
PORTABLE MIXER
Filed Aug. 11, 1954
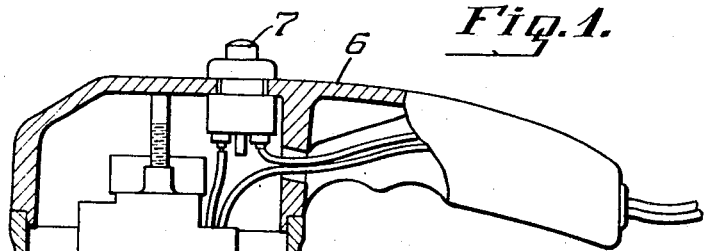
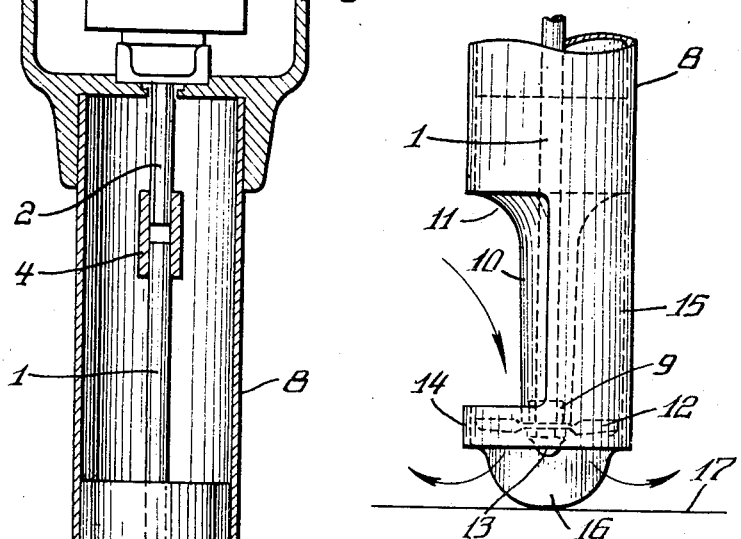
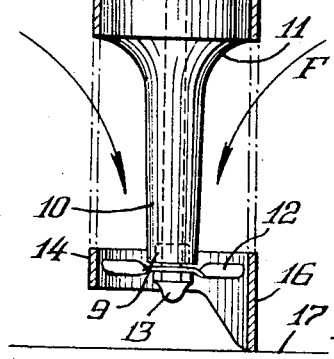
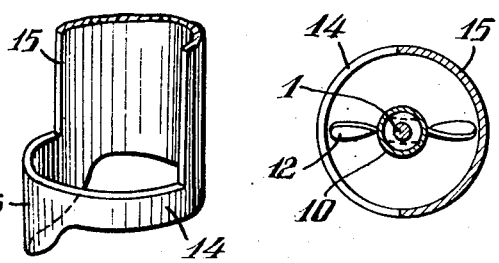
Inventor
Joseph Hubert Ghislain Choppinet
by Kerkhichasty, atty.

# United States Patent Office 2,805,050
Patented Sept. 3, 1957

2,805,050
PORTABLE MIXER

Joseph Hubert Ghislain Choppinet, Uccle, Belgium, assignor to La Magneto Belge S. A., Brussels, Belgium, a joint-stock company of Belgium Application August 11, 1954, Serial No. 449,122

Claims priority, application Belgium March 6, 1954

3 Claims. (Cl. 259—135)

This invention relates to stirrers or mixers and more especially to devices comprising a rotary propeller-like stirring or mixing device with two or more blades at the end of a vertical shaft particularly well adapted for distributing in a liquid substances suspended therein, as may be the case when preparing soups, sauces or the like.

It is an object of this invention to provide a device of the kind aforesaid which can be held by hand, submerged in the liquid at a predetermined distance above the bottom of the vessel in which the suspension is prepared.

In the drawings affixed to this specification and forming part thereof an embodiment of the invention is illustrated diagrammatically by way of example.

In the drawings:

Fig. 1 is a vertical section of the device with the stirring element proper shown in elevation.

Fig. 2 is an elevation of the lower half of the device.

Fig. 3 is a perspective view of the bottom end of the half cylindrical casing surrounding the stirrer.

Fig. 4 is a cross-section of the casing, viewed from below.

Referring to the drawings, 1 is a vertical shaft coupled with the shaft 2 of an electromotor 3 by means of a coupling sleeve 4. 5 is an insulating housing for the motor and 6 is a hollow grip through which extend the current conductors connected to a press-button switch 7.

The shaft 1 is surrounded by a cylindrical casing 8 mounted in the housing 5 and extends through a sleeve 10 fixed to the casing 8 and through a bearing 9 near the bottom end of said sleeve. At the free lower end of the shaft 1 a pair of stirring blades 12 is fixed by means of a screw bolt 13. The slender sleeve 10 is joined to the casing 8 by an enlargement 11 and prevents liquid from entering the casing 8 and fibers or the like from clinging to the shaft.

The stirrer blades rotate with some play within a ring 14 at the bottom end of a substantially semi-circular extension 15 of the casing 8 and from this ring extends downwardly a spacing lip 16 serving to support the device in a predetermined position above the bottom 17 of the mixing vessel. The extension 15 of the casing 8 which connects the ring 14 with this casing, serves as a guide face directing the suspension or similar material to be mixed, which enters through the semi-circular opening bounded by the edges of the semi-circular wall 15, in the direction of the stirrer 12.

The lip 16 forms an important part of the device in supporting the stirrer blades at the correct mixing level. This propeller-like stirrer creates in the ring-shaped casing surrounding it a suction effect which forces the suspended substances towards the blades along downward paths indicated by the arrows F.

The lip 16 should be so formed, as indicated in the drawing, as to facilitate the evacuation of the liquid which has been acted upon by the stirrer while preventing the mixture from girating as a whole.

The size and dimensions of the several portions of the device should be selected with a view to obtaining the best mixing effect dependent on the capacity of the apparatus which may vary within the widest limits.

I wish it to be understood that I do not desire to be limited to the details described in the foregoing specification and shown in the drawings for obvious modifications will occur to a person skilled in the art.

I claim:

1. In a household rotary mixer including a motor driven vertical shaft and a stirrer at the bottom of said shaft, in combination, a casing surrounding the upper part of said shaft, a narrower sleeve surrounding the lower part of said shaft, an annular portion surrounding said stirrer, a wall portion spaced from said sleeve connecting said casing with said annular portion, and a curved spacing lip extending from said annular portion downwardly whereby to suck the material along the wall portion downwardly into contact with the stirrer, and to exhaust the mixture downwardly along the guide face of the curved spacing lip to avoid any turbulence of the stirred mixture.

2. In a household rotary mixer including a motor driven vertical shaft and a stirrer at the bottom of said shaft, in combination, a narrow sleeve surrounding the lower part of said shaft, a wider but only substantially semi-circular wall portion surrounding, with clearance, said sleeve, an annular portion connected with said semi-circular portion surrounding said stirrer, and a curved spacing lip extending from said annular portion downwardly whereby to suck the material along the guide face of the semi-circular wall downwardly into contact with said stirrer, and to exhaust the mixture downwardly along the guide face of the curved spacing lip to avoid any turbulence of the stirred mixture.

3. In a household rotary mixer comprising an electromotor, a casing surrounding said electromotor, a vertical shaft extending downward from said electromotor, and a stirrer mounted on the bottom end of said shaft, in combination, a casing surrounding the upper part of said shaft, a narrower sleeve connected with said shaft casing surrounding the lower part of said shaft and extending into proximity of said stirrer, a substantially semi-circular wall portion substantially approximating the diameter of said shaft casing extending from the bottom of said shaft casing into proximity of said stirrer, so as to surround with a clearance said sleeve, an annular portion at the bottom of said wall portion surrounding said stirrer, and a curved spacing lip extending downwardly from said annular portion, whereby to suck the material to be mixed along the guide face of the semi-circular wall downwardly into contact with said stirrer, and to exhaust the mixture along the guide face of the curved spacing lip to avoid any turbulence of the stirred mixture discharged at the bottom of the mixer.

References Cited in the file of this patent

UNITED STATES PATENTS

| | | |
|---|---|---|
| 1,255,944 | Stevens | Feb. 12, 1918 |
| 1,529,770 | Cavanaugh et al. | Mar. 17, 1925 |
| 1,794,647 | Schuettenhelm | Mar. 3, 1931 |
| 2,016,647 | McMartin | Oct. 8, 1935 |
| 2,570,310 | Bogen | Oct. 9, 1951 |

FOREIGN PATENTS

| | | |
|---|---|---|
| 283,709 | Germany | Apr. 23, 1915 |